US007756680B2

(12) United States Patent
Hammerschmidt

(10) Patent No.: US 7,756,680 B2
(45) Date of Patent: Jul. 13, 2010

(54) ONLINE TESTING OF A SIGNAL PATH BY MEANS OF AT LEAST TWO TEST SIGNALS

(75) Inventor: Dirk Hammerschmidt, Villach (AT)

(73) Assignee: Infineon Technologies AG, Munich (DE)

( * ) Notice: Subject to any disclaimer, the term of this patent is extended or adjusted under 35 U.S.C. 154(b) by 405 days.

(21) Appl. No.: 11/558,778

(22) Filed: Nov. 10, 2006

(65) Prior Publication Data

US 2008/0103705 A1 May 1, 2008

(30) Foreign Application Priority Data

Oct. 27, 2006 (DE) ...................... 10 2006 050 832

(51) Int. Cl.
*G06F 11/30* (2006.01)
*G21C 17/00* (2006.01)

(52) U.S. Cl. ...................................... 702/185; 702/183

(58) Field of Classification Search .................. 702/58, 702/117, 118, 183, 185, 104, 116, 120, 124; 340/514; 324/500, 523, 527
See application file for complete search history.

(56) References Cited

U.S. PATENT DOCUMENTS 6,564,612 B2 5/2003 Brockhaus
7,161,480 B2 1/2007 Hammerschmidt
2005/0038623 A1* 2/2005 Hammerschmidt ......... 702/118

FOREIGN PATENT DOCUMENTS

DE 103 37 045 * 3/2005
GB 1 546 189 7/1976

OTHER PUBLICATIONS

English Abstract of DE 103 37 045, Mar. 2005.*

* cited by examiner

*Primary Examiner*—Michael P Nghiem
(74) *Attorney, Agent, or Firm*—Eschweiler & Associates, LLC

(57) ABSTRACT

A method for online testing of a signal path from a sensor cell to an evaluation point, including providing at least two mutually different test signals, changing the sensor cell output signal on the basis of the at least two mutually different test signals in accordance with a predetermined change specification to obtain the sensor signal, so that the sensor signal depends on the sensor cell output signal and the at least two test signals, outputting the sensor signal or a signal derived from the sensor signal onto the signal path, processing the sensor signal or the signal derived from the sensor signal while taking into account the predetermined change specification to obtain a processed signal, and examining the processed signal with regard to the presence of the at least two mutually different test signals to provide a signal path fault indication on the basis thereof.

33 Claims, 9 Drawing Sheets

ONLINE TESTING OF A SIGNAL PATH BY MEANS OF AT LEAST TWO TEST SIGNALS

RELATED APPLICATIONS

This application claims priority from German Patent Application No. 102006050832.7, which was filed on Oct. 27, 2006, and is incorporated herein by reference in its entirety.

TECHNICAL FIELD

The present invention relates to an online testing of a signal path and, in particular, to the online test of a signal path between a sensor cell and an evaluation point.

BACKGROUND

Sensors play an important part in a multitude of applications. While failures of sensors may damage machines, for example, or may lead to quality losses in products, some sensors are also used in safety-relevant applications, so that any failure or erratic behavior on their part may cause people to be insured or even to die. Therefore, there is a need for reliable sensor systems.

Sensors use, e.g., a change of electronic parameters of a device (sensor cell) due to an external influence (measured quality). For example, in a capacitive pressure sensor, the capacitance of a capacitor changes when its membrane bends due to increasing pressure. A measuring circuit accordingly measures the change in the electric parameters of a sensor cell and converts it to an output voltage or a digital value. The output voltage or the digital value is subsequently transmitted to an evaluation circuit via a signal path, and is evaluated by said evaluation circuit.

Sensor devices, such as pressure or temperature sensors having associated evaluation electronics, are frequently employed in safety-relevant applications. To verify the functionality of the sensor devices, functionality tests and, preferably, self-tests of the sensor devices are performed on a regular basis. Conventionally, self-tests of sensor devices are performed "offline". This means that the sensor device is not operational during the time the self-test is performed. Particularly in such safety-relevant applications it is disadvantageous for the sensor device to not be operational during the self-test.

There are alternative self-test methods for, e.g., temperature sensors and pressure sensors which use an excitation of the sensors due to a temperature increase by means of a heating element or an electrostatic deflection of a capacitive pressure sensor so as to generate testable signal changes. This offers the advantage of being able to also test the sensor at the same time, but is often not acceptable due to the high level of power consumption for achieving the heat output, or due to the very high voltages for deflecting a membrane by means of electrostatics. In addition, due to the low signal energy, these methods necessitate very long observation periods until a defect is diagnosed in a reliable manner. In addition, suppressing parasitic signal paths which couple the high-energy stimulation signal into the signal path downstream from a possible defect and thus prevent the defect from being recognized, are very expensive. Parasitic signal paths in temperature sensors are, for example, the temperature dependence of the circuit of the signal path regarding a warming of the circuit IC by means of a heating element, or a crosstalk between the power supply lines, heat output drivers and heating elements, on the one hand, and nodes of the sensor signal processing circuit, on the other hand. With an electrostatic deflection of MEM capacitors (MEM=micro-electro-mechanical) with high levels of excitation voltages, parasitic signal paths may occur due to a crosstalk via a substrate or operating voltage line. A further disadvantage of these methods is that the measured value of the sensor is corrupted during the self-test. For this reason, these methods do not enable reliable operation of the sensor device during the self-test.

SUMMARY

In accordance with the embodiments, an apparatus for generating a sensor signal which is suitable for online testing of a signal path from a sensor cell to an evaluation point, wherein the sensor cell provides a sensor cell output signal as a function of a physical quantity to be detected, may comprise a means for providing at least two mutually different test signals, a means for changing the sensor cell output signal on the basis of the at least two mutually different test signals in accordance with a predetermined change specification to obtain the sensor signal, so that the sensor signal depends on the sensor cell output signal and the at least two test signals, and a means for outputting the sensor signal or a signal derived from the sensor signal onto the signal path.

In accordance with a further embodiment, an apparatus for online testing a signal path from a sensor cell to an evaluation point, wherein the sensor cell provides a sensor cell output signal as a function of a physical quantity to be detected, wherein the sensor cell output signal is changed in accordance with a predetermined change specification on the basis of at least two mutually different test signals to form a sensor signal, and wherein the sensor signal or a signal derived from the sensor signal is transmittable via a signal path, may comprise a means for processing the sensor signal or the signal derived from the sensor signal while taking into account the predetermined change specification to obtain a processed signal, and a means for examining the processed signal with regard to the presence of the at least two mutually different test signals to provide a signal path fault indication on the basis thereof.

BRIEF DESCRIPTION OF THE DRAWINGS

Embodiments will be explained below in more detail with reference to the accompanying figures, wherein.

DETAILED DESCRIPTION

Figure 1:
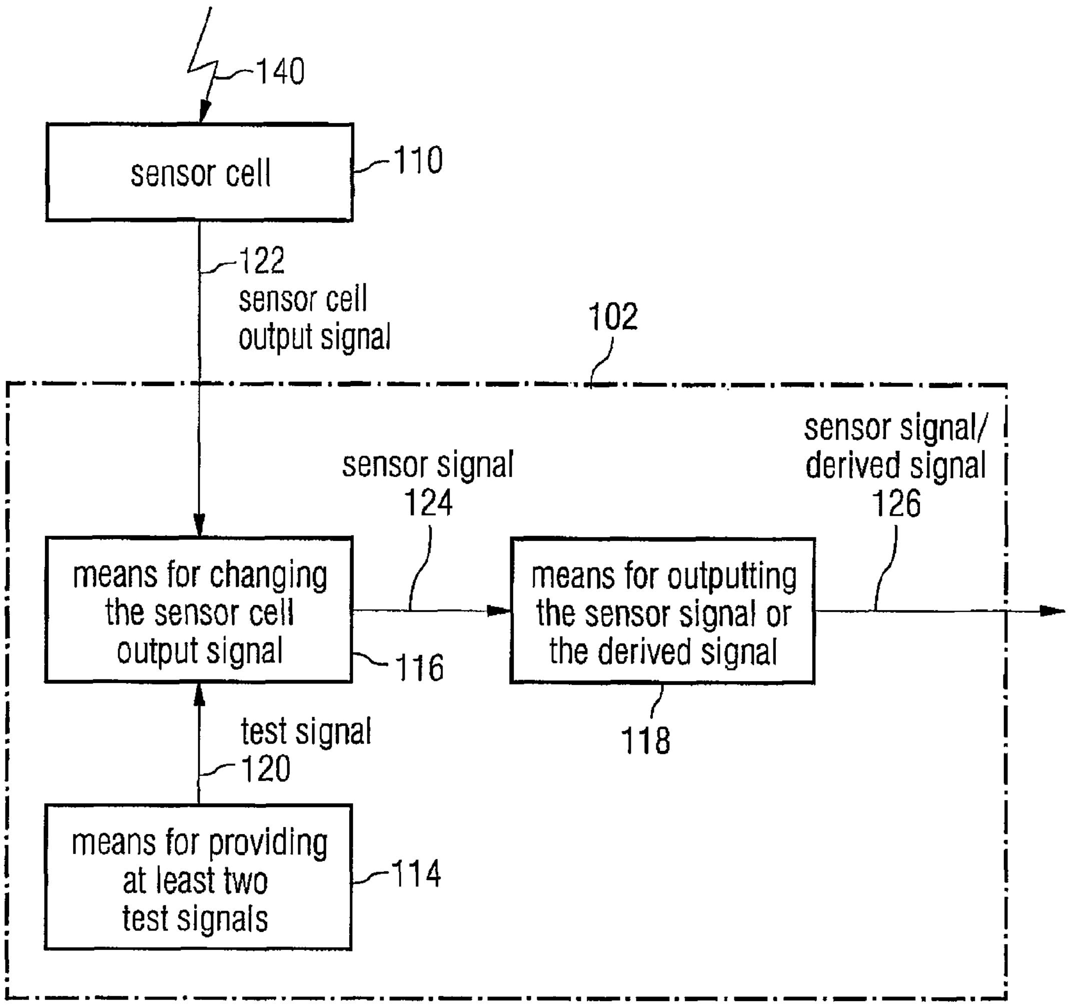
FIG. 1 is a block diagram of an apparatus for generating a sensor signal in accordance with an embodiment.

According to the embodiments, by using at least two different test signals, or test sequences, a reliability of a fault detection may be increased advantageously, in particular when using sigma-delta modulators in the signal path.

With regard to the following description, it should be noted that in the different embodiments, functional elements which are identical or act in an identical manner have the same reference numerals, and that the description of these functional elements may thus be interchanged within the various embodiments presented below.

The term of "signal" will be used below for currents or voltages alike, unless explicitly indicated otherwise.

Prior to explaining in more detail the embodiments with reference to FIGS. 1-11, a concept for an online test of a signal path of a sensor device which uses only a test signal for the online test will be described at this point.

Measurement information generated by a sensor cell may generally be superimposed with test information. The superimposed pieces of information are jointly transferred to an evaluation electronics system. An evaluation of the thus generated sensor signal in the evaluation electronics is drawn upon to test, for example, the functionality of a signal chain between the sensor cell and the evaluation electronics, and to signal, in the event of a failure, that the signals of a sensor device are no longer to be trusted. To this end, a sensor device comprises a sensor means and an evaluation means. The sensor means is connected to the evaluation means via a signal path. The sensor means comprises a sensor cell which provides a sensor cell output signal as a function of a physical quantity to be detected. In accordance with a predetermined change specification, the sensor cell output signal is changed on the basis of a test signal provided. The sensor signal generated in this manner contains both measurement information about the physical quantity detected by the sensor cell, and test information from the test signal. The sensor signal is transferred, via the signal path, to the evaluation means and is received by same. On the basis of the processing specification, the evaluation device separates the measurement information, which is contained in the sensor signal transmitted, from the test information. The retrieved test information enables testing of the entire signal path from the sensor cell to the evaluation point. The retrieved measurement information is processed further independently of the test information.

The above-described concept for performing an online test has the disadvantage that due to the use of only one test signal in connection with second-order sigma-delta modulators in the signal path, the sensor signal may have ranges of values wherein a reliability of the fault detection of the online test clearly decreases. The consequence hereof is that a decision criterion and/or a decision threshold for a fault detection must be set, in order to prevent fault alarms, to be substantially less selective than would be the case, for example, in more than 99% of the sensor device's range of operation.

A second-order sigma-delta modulator used in the signal path is more lightly to provide, with particular input signals in combination with a test signal, typical bit sequences which, for certain ranges of values, may bear similarity with the test pattern used. The deterministic test pattern is thus superimposed with a random pattern resulting from noise shaping of the sigma-delta modulator. With a deterministic (test) signal, a phase position is synchronous to the demodulation signal, and a test result is therefore positive, when the deterministic (test) signal is demodulated. With a pattern generated by a sigma-delta modulator, however, the phase position varies, and the test results may therefore vary across a wide range. Thus, a variance of the test results may increase enormously at the critical points of the range of values, which considerably degrades a selectivity of a self-test for these critical points.

Thus, according to the embodiments, the reliability of the self-test may be increased in that at least two different test patterns, or test signals, are used by means of which the entire testing range and/or the entire range of values of the sensor output signal may be checked in a reliable manner.

An apparatus for generating the sensor signal therefore comprises, in accordance with different embodiments, a means for providing at least two mutually different test signals. In connection with the means for providing, a means is used, in addition, which designs a selection of the at least two mutually different test patterns such that as little time as possible elapses until a potential fault of the signal path is recognized or excluded. In accordance with an embodiment, the signal path comprises a noise-shaping coder, such as a sigma-delta converter, or a predictive coder. On the basis of the test result and the output of the actual signal path, i.e. the sensor output signal, a decision is made as to whether a warning or a fault message is issued and whether additional tests are to be conducted with an alternative test pattern and/or an alternative test signal of the at least two mutually different test signals, so as to confirm or defeat a potential fault indication on the basis of previous tests.

In accordance with an embodiment, the at least two mutually different test signals may be sequentially provided by the means for providing. An evaluation is performed using a means for examining in accordance with embodiments, such that an error, or a fault, is diagnosed only if all test patterns of the at least two mutually different test patterns provide an error diagnosis, i.e. if the means for examining establishes an absence of all of the at least two different test signals.

In accordance with a further embodiment, the means for providing is configured to provide, at the same time, at least two mutually different and orthogonal test patterns and/or test signals so as to be able to change the sensor cell output signal on the basis of the orthogonal test patterns in accordance with a predetermined change specification.

In accordance with a further embodiment, a test signal of the at least two mutually different test signals for online testing of the signal path is changed only when a potential fault is detected. If the test of the signal path is successful using a current test pattern, testing is continued using the same test pattern. If, on the other hand, the fault is confirmed by one or several further ones of the at least two mutually different test patterns, the fault warning is confirmed by a fault message in accordance with embodiments.

In accordance with a further embodiment, a fault probability may alternatively be transmitted which is incremented with each confirmation of the fault by a further test pattern of the at least two mutually different test patterns.

In accordance with a further embodiment, an association of a suitable test pattern with a value or with a range of values of the sensor output signal may be performed. Depending on an estimated value for a next sensor signal output value, a test pattern may be selected, for example, for a subsequent measurement, which probably can be employed successfully, i.e. probably will provide a successful fault diagnosis.

The reliability of a self-test of a signal path may, thus, be advantageously increased by employing at least two different test signals.

Embodiments will be explained in detail below with reference to FIGS. 1-11.

FIG. 1 shows a sensor means comprising an apparatus 102 for generating a sensor signal for an online test of a signal path from a sensor cell 110 to an evaluation point, the evaluation point not being shown in FIG. 1. Apparatus 102 for generating a sensor signal comprises a means 114 for providing at least two mutually different test signals, a means 116 for changing the sensor cell output signal, and a means 118 for outputting the sensor signal or a signal 126 derived from the sensor signal.

Means 114 for providing at least two mutually different test signals further comprise, in accordance with different embodiments, a means for selecting one of the at least two different test signals (not shown).

In addition, in accordance with different embodiments, means 114 for providing at least two different test signals comprise a storage means to be able to store the test signals and/or features of the test signals, such as a bit sequence or a frequency.

Means 116 for changing the sensor cell output signal is coupled to means 114 for providing at least two different test signals via one of the at least two mutually different test signals 120, and to the sensor cell via a sensor cell output signal 122 provided by sensor cell 110. Means 116 for changing the sensor cell output signal is configured to provide, in accordance with a predetermined change specification, a sensor signal 124 in response to the sensor cell output signal 122 and to one of the at least two different test signals 120. Sensor signal 124 contains both measurement information from sensor cell 110 and test information from one of the at least two mutually different test signals 120. In response to sensor signal 124, means 118 for outputting the sensor signal or the derived signal provides a sensor signal or a signal derived from the sensor signal, referred to only as derived signal 126 below. The sensor means shown in FIG. 1 is connected to an evaluation means depicted in FIG. 2 via the derived signal 126.

Generally, sensor cell 110 detects a physical quantity 140. In accordance with different embodiments, the physical quantity 140 to be detected is, for example, a pressure to be detected, the sensor cell 110 accordingly being a pressure sensor. In accordance with embodiments, the pressure sensor may be a capacitive pressure sensor, a capacitive pressure sensor comprising, for example, a capacitor and a membrane. As a result of an increasing or decreasing pressure being exerted on the membrane, the capacitance of the capacitor will change. The change in capacitance depends on the pressure to be detected and is transmitted to the sensor cell output signal 122. Thus, the sensor cell output signal 122 contains measurement information about the physical quantity 140 to be detected. In accordance with an embodiment, in addition to the measurement information, test information can be transmitted to the evaluation means depicted in FIG. 2.

The test information is provided, by means 114 for providing at least two mutually different test signals, in such a manner that the test information, i.e. one of the at least two mutually different test signals, may be transmitted, along with the information about the physical quantity 140 detected, to the evaluation means without influencing the measurement information about the detected physical quantity in the process. The sensor cell output signal 122, containing the measurement information, is combined with one of the at least two mutually different test signals 120, containing the test information, within means 116 for changing the sensor cell output signal in accordance with a predetermined change specification. Possible forms of the change specification are depicted in the following embodiments. Means 116 for changing the sensor cell output signal provides the sensor signal 124 which unites the measurement information and test information. Preferably, the test signal comprises a frequency range which is as remote as possible from that of the sensor cell output signal 122. In this case, the information of sensor cell output signal 122 and of test signal 120 are transmitted via sensor signal 124 in a so called FDMA method (FDMA=frequency division multiple access). Alternatively, sensor signal 124, if its bandwidth is large enough, may also be employed in a TDMA method (TDMA=time division multiple access) or in a CDMA method (CDMA=code division multiple access).

In accordance with embodiments, means 114 for providing at least two mutually different test signals may provide the at least two different test signals simultaneously. For example, orthogonal test patterns may be superimposed at the same time, e.g. by means of one of the multiplex methods mentioned above (FDMA, TDMA, CDMA). In this manner, it is possible to not or only slightly extend a measuring time and/or testing time in relation to only one test signal, and a fault diagnosis may be made as soon as possible, which, however, results in a multiplication of hardware necessitated and reduces a signal swing of sensor signal 124 with each of the at least two different test signals which is added to sensor cell output signal 122.

In accordance with further embodiments, means 114 for providing the at least two different test signals may also provide the test signals and/or test patterns in a manner which is sequential in time.

To pass on sensor signal 124 to the evaluation means, apparatus 102 for generating a sensor signal comprises a means 118 for outputting the sensor signal or the signal derived. Means 118 for outputting the sensor signal or the derived signal may be, for example, a throughline or a driver. In this case, the derived signal 126 corresponds to sensor signal 124. Alternatively, means 118 for outputting the sensor signal or the derived signal may also be a scanning means, such as an analog/digital converter (ADC), a multiplexing means or any other transmission means which enables transmitting sensor signal 124 to the evaluation means depicted in FIG. 2. In accordance with embodiments, means 118 for outputting the sensor signal or the derived signal comprises a sigma-delta converter which comprises, in particular, a second-order sigma-delta modulator.

Figure 2:
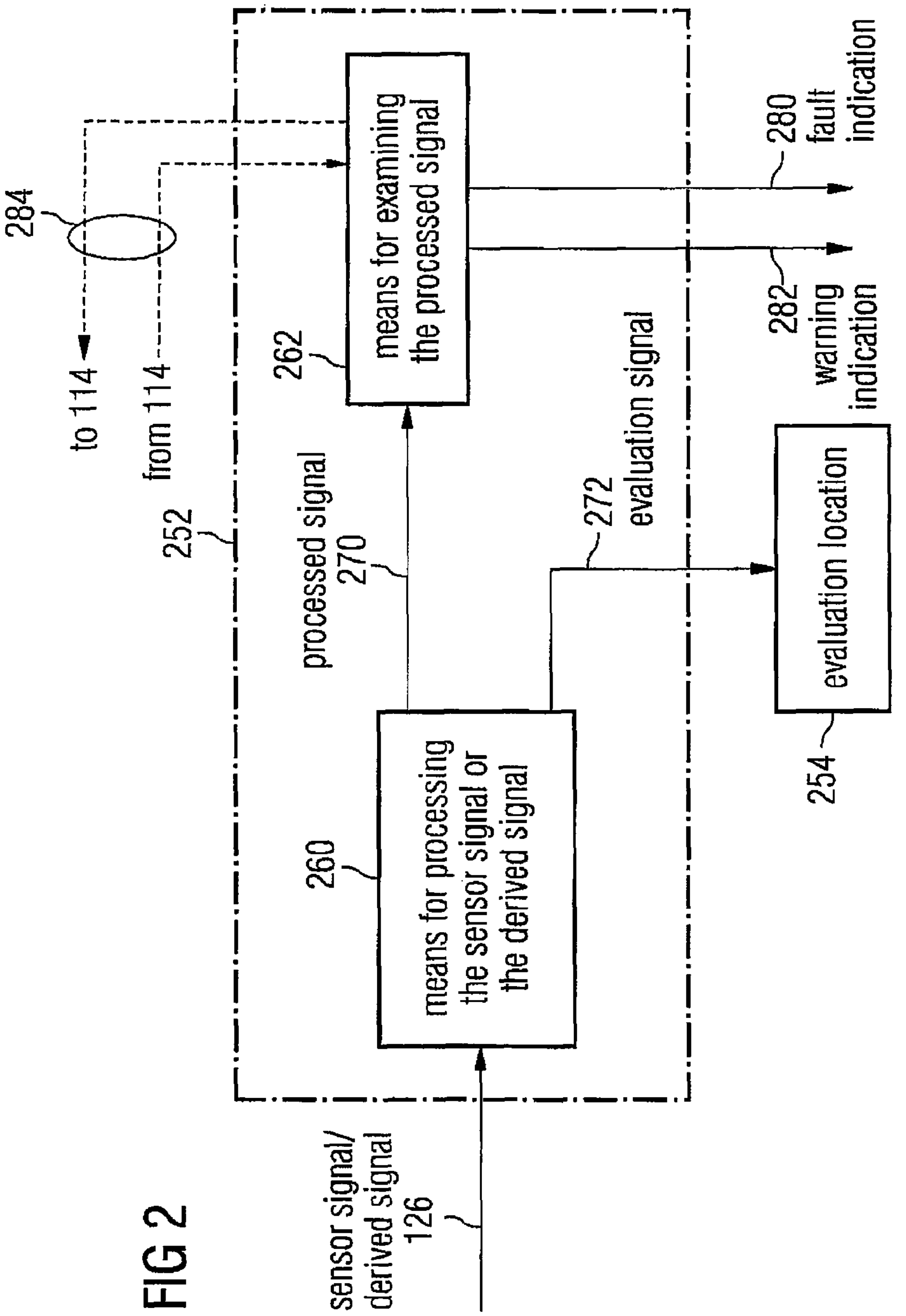
FIG. 2 is a block diagram of an apparatus for online testing of a signal path in accordance with an embodiment.

FIG. 2 shows an evaluation means in accordance with an embodiment, which comprises an apparatus 252 for online testing of a signal path from a sensor cell (depicted in FIG. 1) to an evaluation point 254. Apparatus 252 for online testing of a signal path comprises a means 260 for processing the sensor signal or the derived signal, and a means 262 for examining the processed signal. Means 260 for processing the sensor signal or the derived signal is connected to derived signal 126. Means 260 for processing the sensor signal or the derived signal 126 thus establishes a connection to sensor means 102 shown in FIG. 1. In response to the derived signal 126, means 160 for processing the sensor signal or the derived signal provides a processed signal 270 connected, in accordance with embodiments, to evaluation point 254 and means 262 for examining the processed signal. Means 262 for examining the processed signal is configured to provide a fault indication 280 and/or a warning indication 282. In addition, means 262 for examining the processed signal may be coupled, in accordance with embodiments, to means 114 for providing, depicted in FIG. 1, as is indicated in FIG. 2 by the dotted connection arrows 284.

Means 260 for processing the sensor signal or the derived signal is configured to detect the derived signal 126. As has already been described above with reference to FIG. 1, derived signal 126 contains both measurement information and test information. Means 260 for processing the sensor signal or the derived signal is configured to separate the measurement information from the test information 120 while taking into account the predetermined change specification used by means 116, depicted in FIG. 1, for changing the sensor cell output signal. The measurement information is passed on from means 260 for processing the sensor signal or the derived signal to evaluation point 254 via evaluation signal 272. The retrieved test information and/or at least one of the at least two mutually different test signals is passed on from means 260 for processing the sensor signal or the derived signal to means 262 for examining the processed signal via the processed signal 270. Means 262 for examining the processed signal is configured to examine the processed signal 270 with regard to a presence or an absence of the test information of one of the at least two mutually different test signals, and to provide a fault indication 280 and/or a warning indication 282 in the event of an absence.

As is indicated by reference numeral 284 in FIG. 2, means 262 for examining the processed signal may be coupled to means 114 for providing the at least two different test signals. In accordance with embodiments, for example information about currently used test signals for the online test may be exchanged via coupling path 284. Means 262 for examining the processed signal may receive, for example from means 114 for providing the at least two different test signals, information about which test signal of the at least two different test signals is active at the moment. In the event of a decision, coming from means 262 for examining the processed signal, that a test information is absent, means 262 for examining may instruct means 114 for providing to perform, e.g., a test signal change, i.e. conductance and/or repetition of the online test using another one of the at least two mutually different test signals.

The error indication 280 and/or the warning indication 282 may give an indication concerning a reliability of the signal path from sensor cell 140 to evaluation point 252. If the test information was correctly transmitted via the signal path, it is very likely for the measurement information to also have been transmitted correctly. If the test information is not correctly verified within means 262 for examining the processed signal, indications 280 and/or 282 signal that the evaluation signal 272 is possibly not reliable.

In embodiments, at least one, if not all, of the at least two mutually different test patterns causes a fault indication 280, a warning indication 282 will be output. In accordance with further embodiments, means 262 for examining the processed signal may provide a number of the test patterns with a fault diagnosis. The measurement time necessitated then results from multiplying the testing time necessitated for a test pattern by the number of the test patterns used, if the test patterns are provided sequentially.

Means 260 for processing the sensor signal or the derived signal is configured to provide a processed signal 270 and an evaluation signal in response to the derived signal 126.

FIGS. 3 to 6 depict different embodiments of a sensor means connected to an evaluation means. The sensor means comprises an apparatus for generating a sensor signal, and the evaluation means comprises an apparatus for online testing of a signal path.

Figure 3:
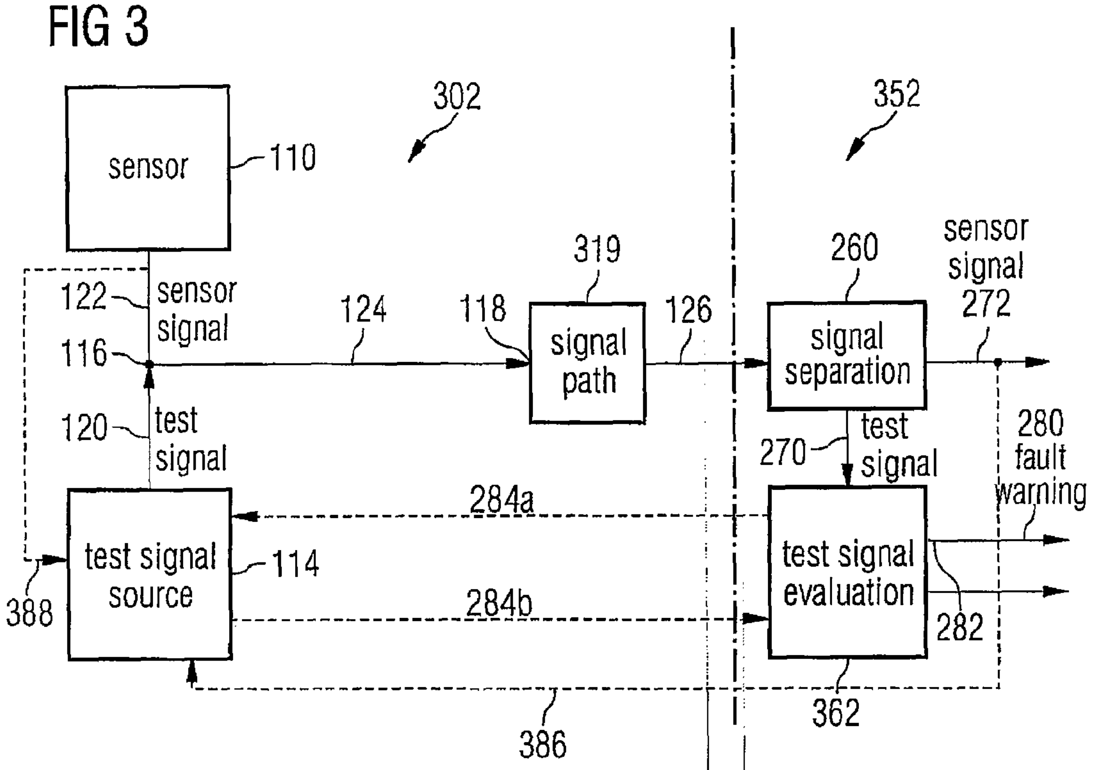
FIGS. 3-6 are block diagrams of embodiments of sensor devices comprising an apparatus for generating a sensor signal and an apparatus for online testing of a signal path in accordance with embodiments.

An apparatus 302, depicted in FIG. 3, for generating a sensor signal comprises a sensor cell 110 in the form of a sensor, a means 114 for providing at least two mutually different test signals in the form of a test signal source, a means 116 for changing the sensor cell output signal, and a means 318 for outputting the sensor cell to a signal path 319.

As has already been described with reference to FIG. 1, means 114 for providing at least two different test signals simultaneously provides one or a plurality of the at least two mutually different test signals comprising test signal information, and sensor cell 110 provides a sensor cell output signal 122 containing information about a physical quantity detected. In response to test signal 120 and to sensor cell output signal 122, means 116 for changing the sensor cell output signal provides a sensor signal 124. In response to sensor signal 124, means 118 for outputting the sensor signal provides the sensor signal on signal path 319. In this embodiment, signal path 319 comprises an amplifier chain or an analog-digital converter, in particular a sigma-delta converter, which provide a derived signal 126.

In this embodiment, the change specification causes one or a plurality of the at least two mutually different test signals 120 to be fed into sensor cell output signal 122. The change is performed within means 116 for changing the sensor cell output signal. If sensor cell 110 has a resistive measuring bridge, the change will be performed by feeding the test signal 120 in the form of a switched current into sensor cell output signal 122 in the form of an output line of the resistive measuring bridge. At bridge resistors of the measuring bridge, the current switched causes a change in the bridge output voltage. The same applies to a sensor cell 110 in the form of a Hall sensor cell comprising a Hall plate. In this embodiment, test signal 120 is defined by its current intensity. Means 116 for changing the sensor cell output signal is a nodal point of sensor cell output signal 122 and of test signal 120.

Apparatus 252 for online testing of signal path 319 from a sensor cell 110 to an evaluation point 262 comprises, in accordance with the embodiment shown in FIG. 2, a means 260 for processing the sensor signal, or the signal derived from the sensor signal, in the form of a signal separation means, and a means 262 for examining the processed signal in the form of a test signal evaluation means. Means 260 for processing the sensor signal is configured to detect the derived sensor signal 126 and to provide, in response to the derived sensor signal 126, a processed signal 270 and an evaluation signal 272, which ideally corresponds to sensor cell output signal 122. Evaluation signal 272 therefore contains the information about the physical quantity detected by sensor cell 110 and redirects same to an evaluation point (not shown). Means 262 for examining the processed signal 270 with regard to a presence or absence of information of one or a plurality of test signals of the at least two mutually different test signals is configured to provide a fault indication 280 and/or a warning indication 282 in the event of an absence of information of the test signal 120.

As has already been described above, means 262 for examining may optionally be coupled to test signal source 114. In accordance with embodiments, means 262 for examining the test signal source 114 may signal, via coupling signal 284*a*, that a test signal change is to take place. Via coupling signal 284*b*, the means for providing 114 may provide means 262 for examining with information about the test signal currently employed by means 114.

In accordance with embodiments, the evaluation signal 272 may optionally be coupled to means 114 for providing at least two different test signals, which is indicated by reference numeral 386. This may be advantageous in particular if a test pattern is provided by means 114 for providing using a value or a range of values of evaluation signal 272. Depending on an estimated value for a next value of evaluation signal 272, a test pattern and/or a test signal may then be selected, for a next measurement, from the plurality of mutually different test signals, which may be employed potentially successfully for the corresponding value and/or range of values.

In accordance with further embodiments, sensor cell output signal 122 may optionally be coupled to means 114 for providing at least two different test signals, which is indicated by reference numeral 388. This may be advantageous in particular if a test pattern is provided by means 114 for providing using a value or a range of values of sensor cell output signal 122. Depending on an estimated value for a next value of sensor cell output signal 122 a test pattern and/or a test signal may then be selected, for a next measurement, from the plurality of mutually different test signals, which may be employed potentially successfully for the corresponding value and/or range of values.

The architecture and the function of the apparatus 252, shown in FIGS. 3-6, for online testing of a signal path correspond to those of the embodiment shown in FIG. 2 and will not be explained in more detail below.

Figure 4:
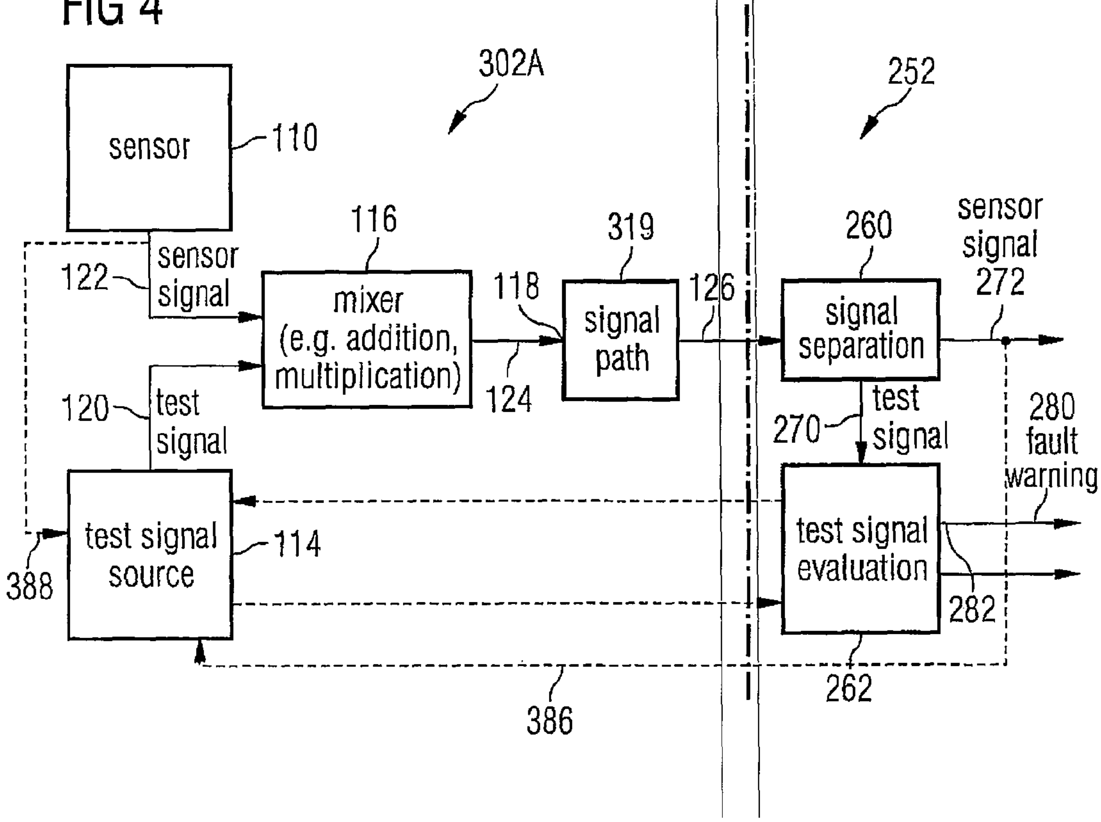

FIG. 4 shows a further embodiment of an apparatus 302*a* for generating a sensor signal. The embodiment, depicted in FIG. 4, of the present application differs from the embodiment depicted in FIG. 3 with regard to the configuration of means 116 for changing the sensor cell output signal. All other elements are unchanged and have the same reference numerals as in FIG. 3. Means 116 for changing the sensor cell output signal is realized, in this embodiment, in the form of a mixer. Means 116 for changing is configured to add, or modulate, one or a plurality of the at least two mutually different test signals to sensor cell output signal 122. This may be performed by an additive or multiplicative test signal input.

Figure 5:
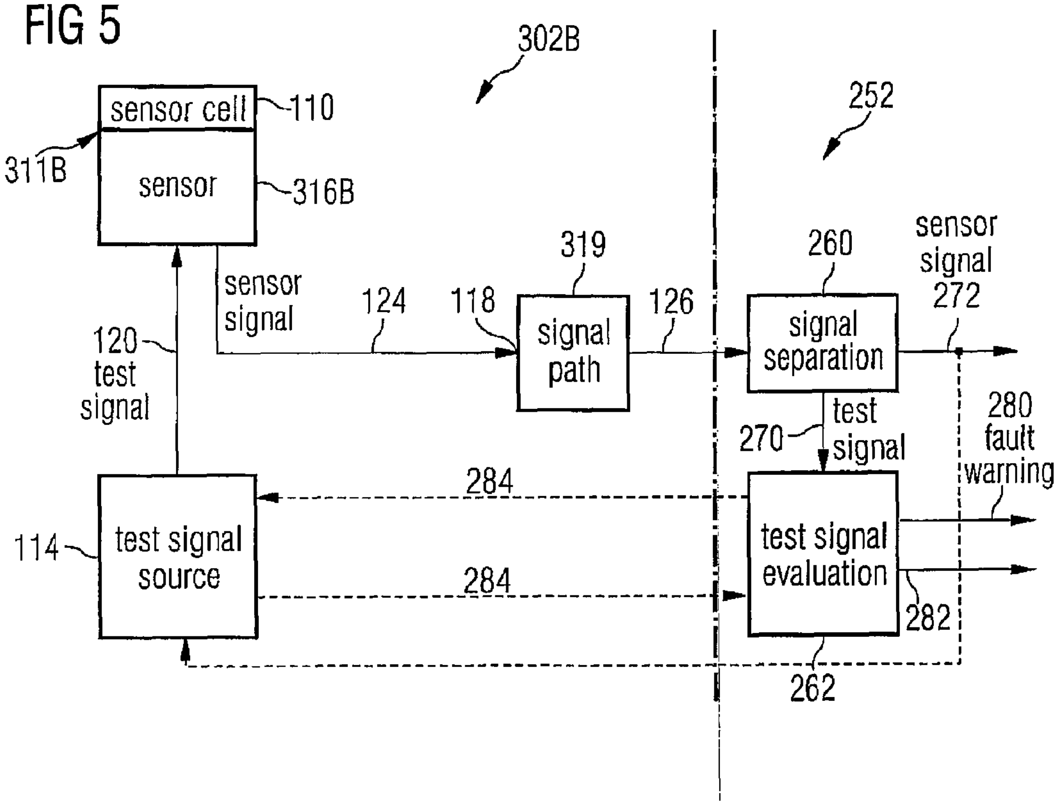

FIG. 5 depicts a further embodiment of an apparatus 302*b* for generating a sensor signal. In this embodiment, sensor cell 110 is integrated into a sensor circuit 512, which additionally comprises a means for changing the sensor cell output signal 116. The remaining elements shown correspond to those of FIGS. 3 and 4, have been given the same reference numerals and will not be explained in more detail below.

Means 116 for changing the sensor cell output signal comprises a sensor excitation voltage (not shown) and is configured to provide sensor signal 124 in response to the sensor cell output signal (not shown) of sensor cell 110 on the basis of the sensor excitation voltage. Means 116 for changing the sensor cell output signal is additionally configured to perform a change in the sensor excitation voltage on the basis of one or a plurality of the at least two mutually different test signals 120. In this manner, sensor signal 124 depends both on the sensor cell output signal and on one or a plurality of the at least mutually different test signals 120.

Figure 6:
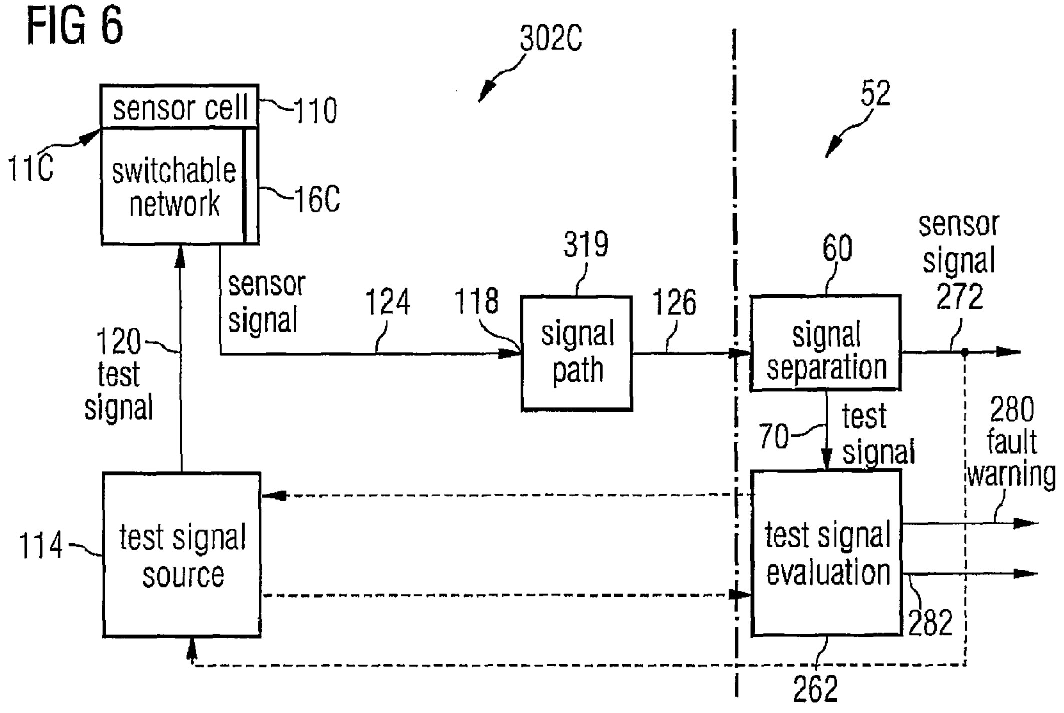

FIG. 6 shows a further embodiment of apparatus 302*c* for generating a sensor signal. In this embodiment, sensor cell 110 is arranged within sensor circuit 614 which additionally comprises a means 116 for changing the sensor cell output signal in the form of a switchable network. All other elements shown correspond to FIGS. 3-5, have been given the same reference numerals and will not be explained in more detail below.

Means 116 for changing the sensor cell output signal is configured to change a sensor configuration of sensor circuit 614 in response to one or a plurality of the at least two mutually different test signals 120. If sensor circuit 614 comprises a capacitive or a resistive measuring bridge, within which the sensor cell 110 is arranged, the change specification of means 116 for changing the sensor cell output signal may comprise switching on and/or off capacitors or resistors as a function of one or a plurality of the at least two mutually different test signals. In this manner, the sensor cell output signal (not shown), which contains information about a physical quantity to be detected, is combined with test signal information and provided as the sensor signal 124.

Figure 7:
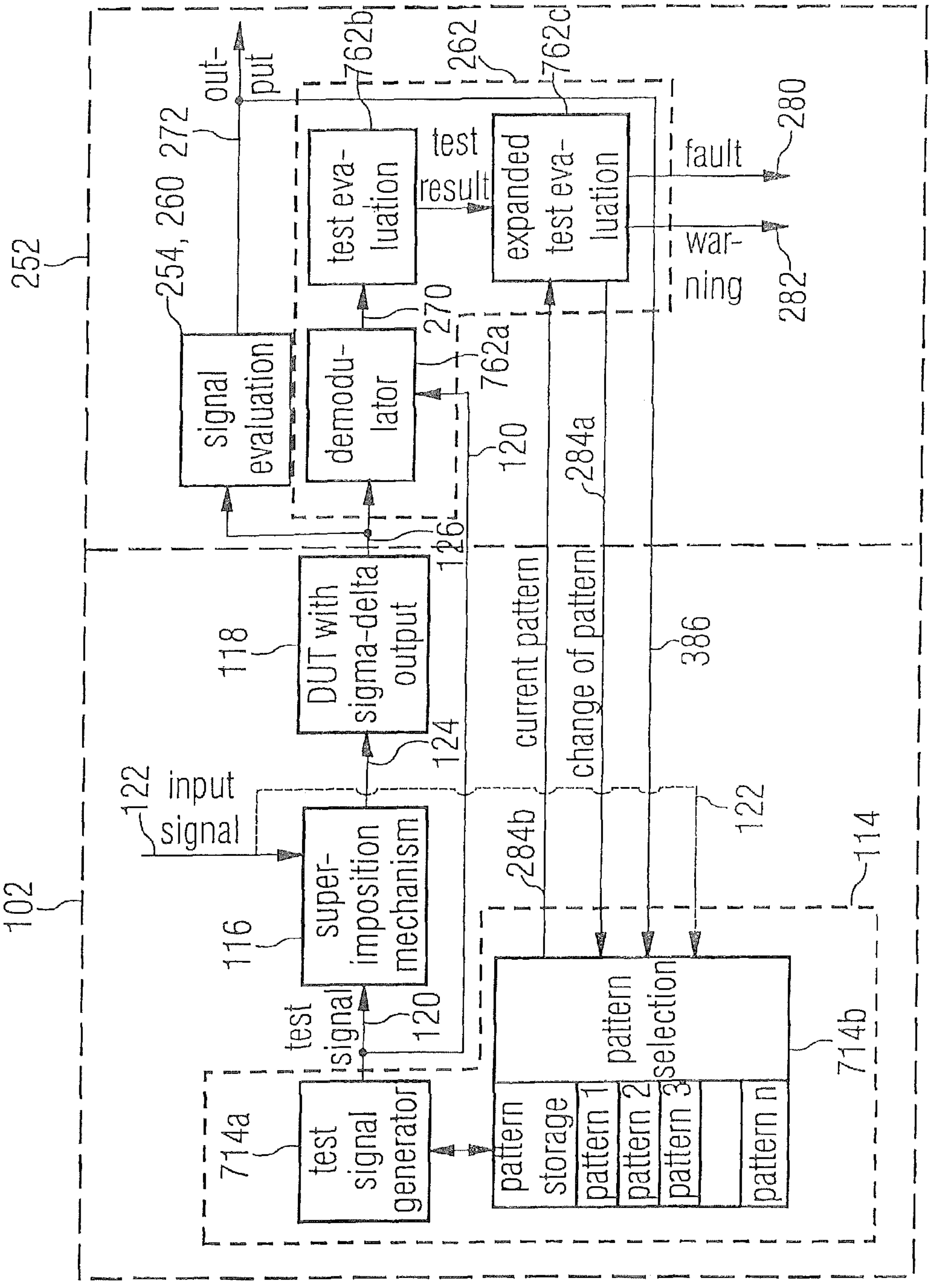
FIG. 7 is a general-overview block diagram for an online test of a signal path comprising an apparatus for generating a sensor signal and an apparatus for online testing of the signal path in accordance with an embodiment.

A sensor device summing up FIGS. 1-6 is schematically shown by a block diagram in FIG. 7. In accordance with an embodiment, means 114 for providing at least two mutually different test signals comprises a test signal generator 714*a* coupled to a selection means 714*b*. Means 714*b* for selecting the at least two mutually different test signals comprises, in accordance with an embodiment, a test pattern memory having n test patterns and/or features of test patterns stored therein.

The n stored test patterns may be selected in accordance with a test specification which will be explained in more detail below. Means 714*b* for selecting one of the at least two different test signals transmits one or a plurality of the at least two different test signals to test signal generator 714*a* to output the test signal 120, which is combined, by means of a superimposition mechanism of means 116 for changing the sensor cell output signal, with sensor cell output signal 122 to form sensor signal 124.

Sensor signal 124 forms the input of means 118 for outputting the sensor signal or a signal derived therefrom, means 118 including, in accordance with an embodiment, signal path 319 with a sigma-delta converter, in particular a second-order sigma-delta modulator. At a node and/or at the means for processing the derived signal 260, the derived signal 126 is fed to a signal evaluation block 254 to obtain evaluation signal 272 which is optionally coupled, via a coupling path 386, to means 114 for providing the at least two mutually different test signals.

A second branch of the derived signal 126 arising from node 260 is fed to means 262 for examining the processed signal, as has already been described above. In the embodiment depicted in FIG. 7, means 262 for examining comprises a demodulator 762*a*, the derived signal 126 being present at a first input of demodulator 762*a*, and test signal 120 being present at a second input. The demodulator represents a so called matched filter for one or a plurality of the at least mutually different test signals 120. Processed signal 270, which contains the test information, is present at the output of the demodulator.

The processed signal 270 is fed to means 262 for examining the processed signal, means 262 for examining comprising, in accordance with embodiments, a test evaluation 762*b* and an extended test evaluation 762*c*. Within test evaluation 762*b*, for example, the demodulated and/or processed signal 270 is low-pass filtered to obtain a similarity measure between the derived signal 126 and the test signal 120.

In accordance with embodiments, this similarity measure may be fed to the extended test evaluation 762*c* as a test result so as to decide, for example, whether the similarity measure is sufficient for a positive test evaluation, or whether, in the event of the similarity measure being too small, a warning signal 282 and/or a fault signal 280 is output. To this end, means 262 is coupled, in the manner depicted in FIG. 7, to means 114 for providing the at least two mutually different test signals via coupling paths 284*a,b* so as to be able to signal a test pattern change to means 114, on the one hand, and to obtain information about the currently used test pattern from means 114, on the other hand.

If one looks at an individual test signal of the at least two mutually different test signals, it may happen that in connection with second-order sigma-delta modulators, there are ranges of values within the signal path wherein a reliability of a fault detection clearly decreases. This connection is depicted in subsequent FIGS. 8*a* and 8*b*.

Figure 8A:
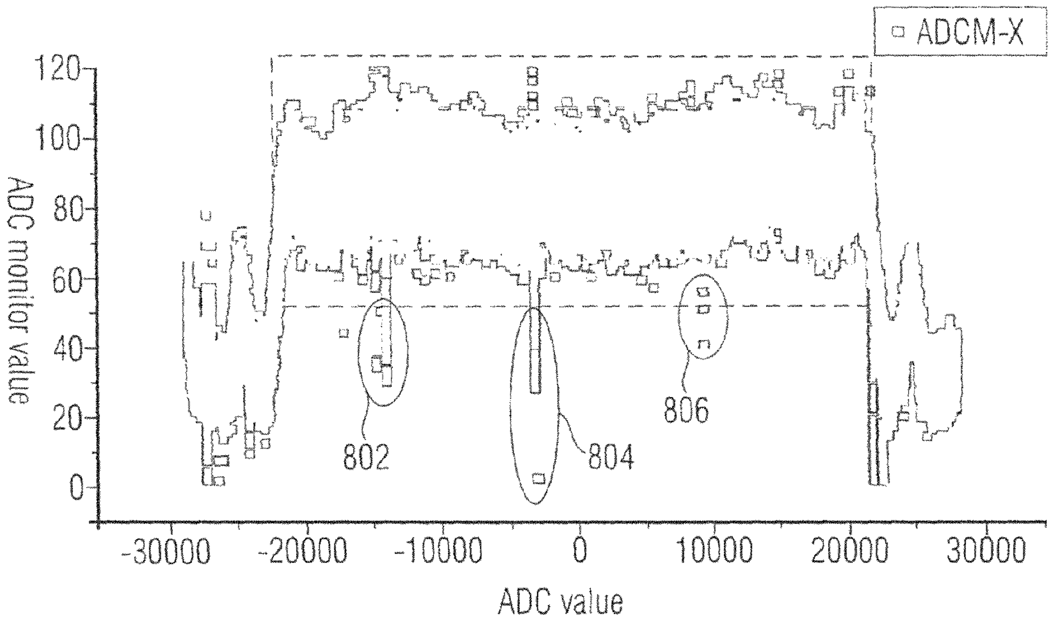
FIGS. 8*a* and 8*b* show statistics of cross-correlations of different test signals with sensor signals, the sensor signal depending on the sensor cell output signal and the test signal.

FIG. 8*a* shows statistics of a sensor signal 126 demodulated with a certain test sequence in accordance with FIG. 7, the demodulated signal 270 subsequently also being fed to a low-pass filter within test evaluation 762*b*, in particular to a decimation low-pass filter. The output of the decimation low-pass filter is plotted across the range of values of the sensor cell output signal on the y axis of the graph depicted in FIG. 8*a*. The value of the signal at the output of the decimation low-pass filter of means 262 for examining is a measure of the similarity between the test signal and the sensor signal and/or derived signal 126, which, in addition to the measurement information, also contains the test information. The relevant range within which the sensor output signals may be located, is limited to −20.000 to +20.000 here. Outside this range, the sigma-delta modulators used in the signal path in accordance with embodiments are overdriven, which will certainly lead to a fault within means 262 for examining the processed signal 270, which fault, however, need not be covered by the testing function.

Within the square indicated in FIG. 8*a*, large parts of the range of values of the sensor output signal may be covered by the test functionality, e.g. when a check is made as to whether the test output and/or the output of the decimation low-pass filter described provides a value of, e.g., more than 50. This criterion will fail only at few individual points and/or ranges of values marked by reference numerals 802, 804 and 806.

If the online test is repeated with a different test pattern, this will lead to a change in the test result, it being possible for the points having a poor test relevance to be located at different locations of the range of values. This fact is represented in FIG. 8*b*, the test criterion (decimation low-pass output signal>50) failing at the individual points and/or ranges of values marked by reference numerals 808, 810, 812, 814, and 816.

Figure 8B:
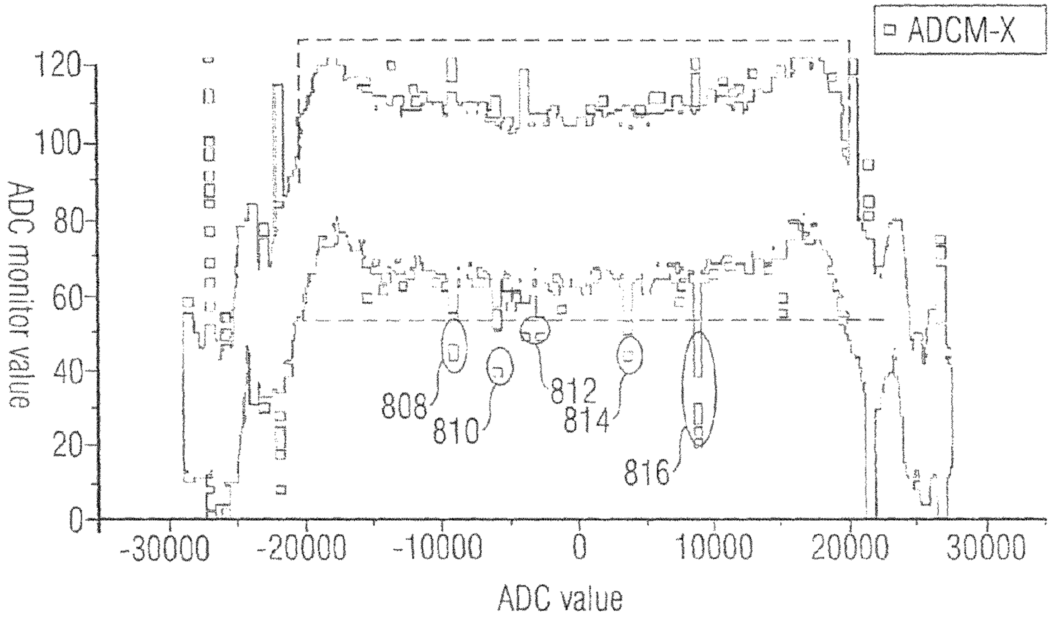

This observation may be explained in that a second-order sigma-delta modulator used in the signal path is increasingly likely, with certain input signals, i.e. sensor signals 124, to provide typical bit sequences which bear similarity with the particular test patterns 120 used within those ranges of values of sensor cell output signal 122 which are marked in FIGS. 8*a*, 8*b*. Thus, a deterministic test pattern is superimposed by a random pattern resulting from the noise shaping of the sigma-delta modulator. With a purely deterministic test signal within sensor signal 126, the phase position of the test signal is synchronous with the demodulated signal and/or processed signal 270, and in this case, the test result is positive. With the patterns within sensor signal 126 which are generated by the sigma-delta modulator, however, the phase position generally varies, and the test results may spread across a wide range despite the presence of a test sequence within sensor signal 126, as is shown in FIGS. 8*a, b*. The noise shaping functionality of a sigma-delta modulator acts, in the ranges of values marked in FIGS. 8*a, b*, as a filter, as it were, for a test signal 120 which in these cases comprises, in combination with sensor output signal 122, a relatively high level of correlation with the quantization noise of the sigma-delta modulator. Therefore, the variance of the test results sharply increases at the critical points of the range of values, which considerably degrades the selectivity of the self-test for these critical points. This need not necessarily be the case for a different test pattern.

Therefore, the present concept makes use of a means 114 for providing at least two different test signals, using which the entire test range and/or sensor output signal range may be checked in a reliable manner. To this end, means 114 for providing comprises, in accordance with embodiments, a control unit and/or a selection unit preferably designing the selection of the at least two different test patterns such that as little time as possible elapses until a potential fault is recognized or excluded. On the basis of the test result and the output of the actual signal path, i.e. based on the evaluation signal 272, a decision is made, in accordance with embodiments, as to whether a warning 282 or a fault message 280 is output, and as to whether additional tests are to be performed with an alternative test pattern so as to confirm or defeat a potential fault indication based on previous tests.

In accordance with an embodiment, the at least two mutually different test patterns may be provided sequentially. The evaluation may then be conducted such that a fault is diagnosed, for example, only if all test patterns of the at least two different test signals provide a fault diagnosis.

In accordance with further embodiments, a warning 282 may be output if not all, but at least one of the at least two different test signals provides a fault diagnosis. Alternatively, a number of the test signals comprising a fault diagnosis may also be transmitted. The measuring time is directly proportional to the number of test signals used.

In accordance with further embodiments, the means for providing may provide orthogonal test patterns simultaneously and in a superimposed manner. This may be effected by means of a multiplex method, such as a CDMA, FDMA or TDMA method. These embodiments provide the advantage that the measuring time at least is not extended substantially, and that the fault diagnosis occurs as quickly as possible. However, for this purpose, a multiplication of the hardware necessitated is necessary, and the signal swing is reduced with each test pattern 120 added to the sensor output signal 122.

In accordance with a further embodiment, a test pattern will be replaced only if a potential fault is detected for this test pattern by means of 262 for examining. Thus, the time elapsing up until a first possibility of providing a diagnosis may be shortened in relation to the above-described sequential provision of all test patterns. As the situation may be, it is also possible to only signal a warning to a next level up in a signal processing chain. If the test involving the current pattern is successful, testing is continued, in accordance with the embodiment, with the same pattern. If, however, a fault is confirmed by one or several further test patterns of the at least two mutually different test patterns, the warning 282 is replaced by a fault message 280. Alternatively, a fault probability may also be transmitted, which is incremented by a further test pattern with each confirmation of the fault. If a further test pattern does not confirm the fault, it is a local weak point of the test pattern with a fault warning, the warning can be cancelled, and the monitoring and/or the online testing is continued with the new test pattern, since it may be assumed that the new test pattern is more suitable for the range of values of the current sensor output signal 122 and/or of the evaluation signal 272.

In accordance with a further embodiment, a suitable test pattern 120 may be associated with a value or a range of values of sensor cell output signal 122 and/or of evaluation signal 272, since, as has already been described above, a cross-correlation of test patterns 120 with the derived signal and/or with output signal 126 of the sigma-delta modulator comprises a dependence on the input value of the sigma-delta modulator. The association may be effected, for example, as a function of an estimated value for a next signal output value 272 or an estimated value for a next sensor output signal value 122. Depending on the estimated value for the next signal output value, a test pattern, which is likely to be successfully employed, may then be selected for the next measurement.

Figure 9:
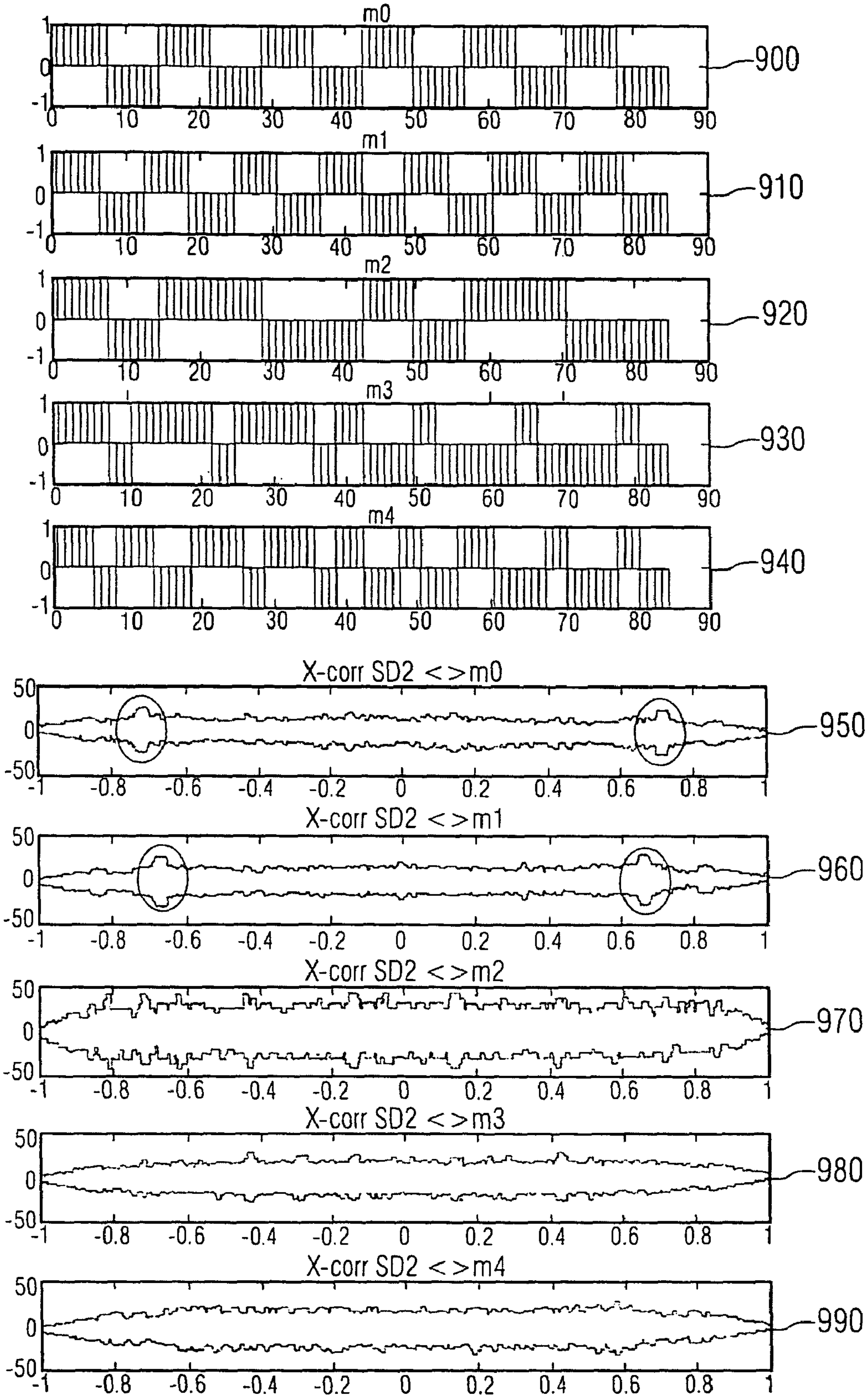
FIG. 9 is a representation of different test signals and cross-correlations of the different test signals with sensor cell output signals in accordance with an embodiment.

Cross-correlations between different test signals 120 and sensor signals 126 derived by a sigma-delta modulator are depicted in subsequent FIG. 9.

FIG. 9 shows, in the upper part, a plurality of mutually different test signals 900 to 940 of equal length (84 samples each). In addition, FIG. 9 shows, in the lower part, for each of these test patterns simulations of cross-correlations 950 to 990 with a normalized output signal of a second-order sigma-delta modulator.

The cross-correlation marked by reference numeral 950 represents the cross-correlation between test sequence 900 and the sigma-delta modulated sensor signal 126 in its entire range of values (−1 to +1). Accordingly, the cross-correlation marked by reference numeral 960 represents the cross-correlation of test signal 910 with the sigma-delta modulated sensor signal 126. In the same manner, test sequences 920, 930 and 940 correspond to cross-correlations 970, 980, and 990, respectively.

The cross-correlations represented in FIG. 9 come about in that in FIG. 7, test signal 120, for example, is decoupled from means 116 for changing the sensor cell output signal and is provided only to demodulator 762*a*. Thus, the derived signal 126 present at the first input of demodulator 762*a* comprises merely measurement information from a sensor cell.

With the cross-correlations 950 to 990 shown in FIG. 9, ranges may be recognized wherein the variance of the cross-correlation increases in each case. These ranges are striking particularly for cross-correlations 950 and 960, and are characterized by circles. If one contemplates cross-correlation 950, one may see that within a range of values at about ±0.72, the variance of the cross-correlation clearly increases. This means that for the range of values of about ±0.72 of the sigma-delta modulated sensor signal 126, test signal 900 is less suitable. Better suited for this range of values is, e.g., test signal 910, since it comprises no increased variance of the cross-correlation for the range of values at ±0.72 of the sigma-delta modulated sensor signal 126. For test signal 910, the range of the increased variance is rather at a range of values of about ±0.65 of the sigma-delta modulated sensor signal 126.

Thus, if test signal 900 is used, for example, for an online test, and if a future normalized and/or sigma-delta modulated sensor output signal value of about ±0.72 may be estimated by means of an estimation, it is advantageous, in accordance with an embodiment, to change, for example, from test signal 900 to test signal 910 (or a different one) to guarantee successful online testing.

Thus, cross-correlations 950 to 990 show that solely combing the first two extremely simple test patterns 900 and 910 results in a substantial decrease of the maximum cross-correlation, and that thus, the selectivity of the self-test may be increased considerably. Further improvements may be achieved as the number of test patterns is increased.

Since sigma-delta converters are typically operated at very high oversampling rates, it may be assumed, in the simplest case, that an output value of a sigma-delta converter does not change substantially between two successive samples, and the previous output value may therefore be drawn upon as an estimated value. If one additionally includes, for example, the output value before last, the probable change between two successive output values may also be determined (difference of the two values as the estimated value for the first derivation), and the estimated value may be corrected accordingly by repeated addition of the difference. As the number of past measured values increases, higher derivations may be estimated and included into calculating the value likely to be next. If additional information about a waveform of the sensor cell output signal 122 are further known (for example sinusoidal waveform having a frequency which is variable at a slow rate only), more precise estimation methods may be derived therefrom in accordance with embodiments. For example, the frequency of the sinus may be determined, and a very accurate estimated value of the sensor cell output signal 122 may be determined for the next measurement.

In accordance with embodiments, the association of a suitable test signal with a value or a range of values of sensor cell output signal 122 may be predefined in advance, for example on the basis of simulations of the cross-correlations of different test patterns 120 with the sigma-delta modulated sensor signal 126, as is depicted in FIG. 9 by way of example. Here, care is to be taken that the ranges with, for example, a higher variance may be shifted by spreading parameters of the sigma-delta modulators (offset, gain error).

It is therefore recommendable to perform the association by means of a learning operation. This learning operation may be realized, in accordance with embodiments, in connection with changing a test signal 120 in the event of a potential fault, as has already been described above. In the event of a failure of a test pattern, which is not conformed by the others of the at least two mutually different test patterns, it may be stored, in accordance with embodiments, that this test pattern is unsuitable within the range of the respective sensor cell output signal value. Then the unnecessary test using this pattern may be avoided if the signal value comes up again. This learning operation may be conducted, for example, both in manufacturing (during the test or during a calibration) and during the operation in the application.

Figure 10:
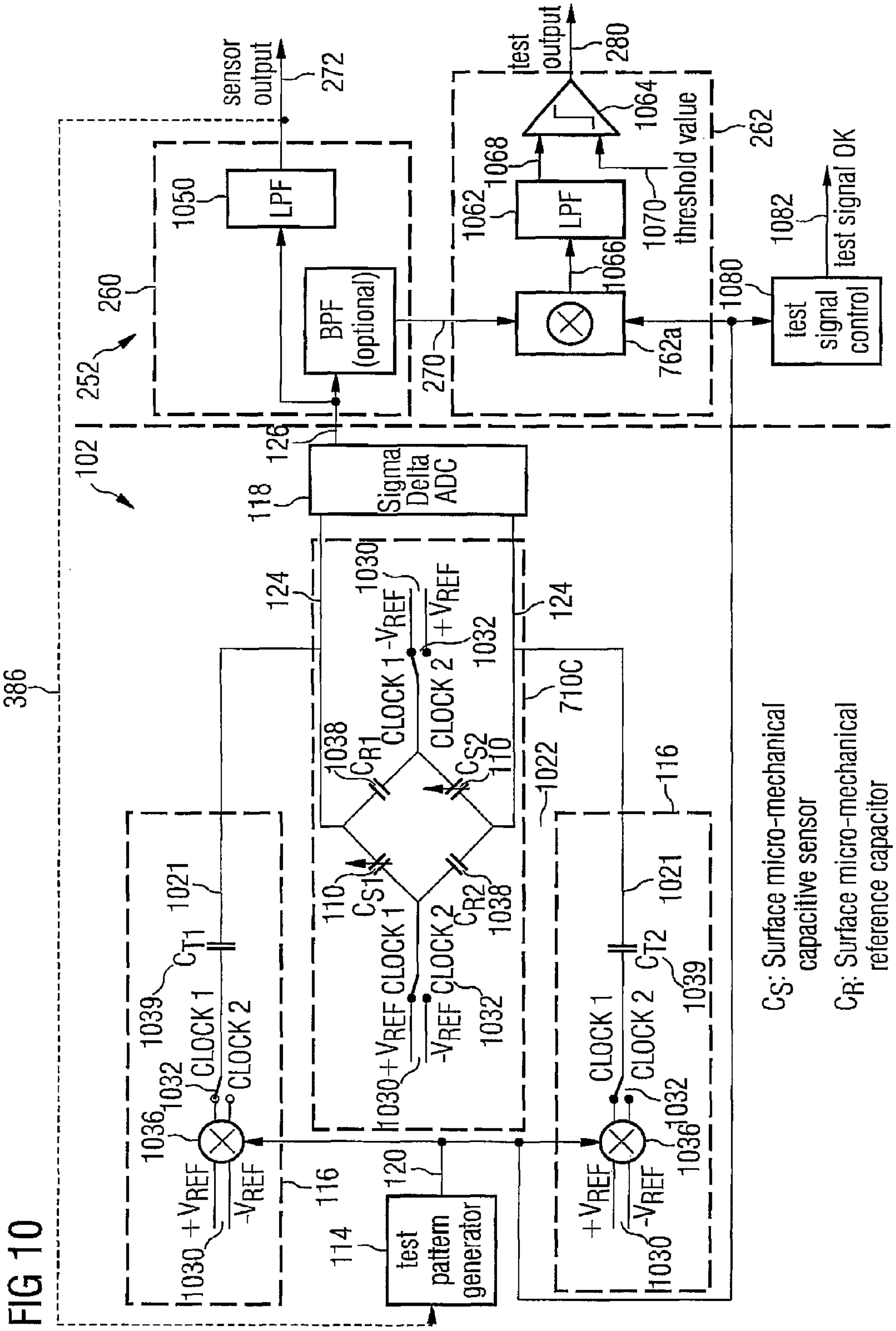
FIGS. 10 and 11 are block diagrams of sensor devices comprising an apparatus for generating a sensor signal and an apparatus for online testing of a signal path, the apparatus being connected to one of the at least two different test signals, in accordance with further embodiments.
Figure 11:
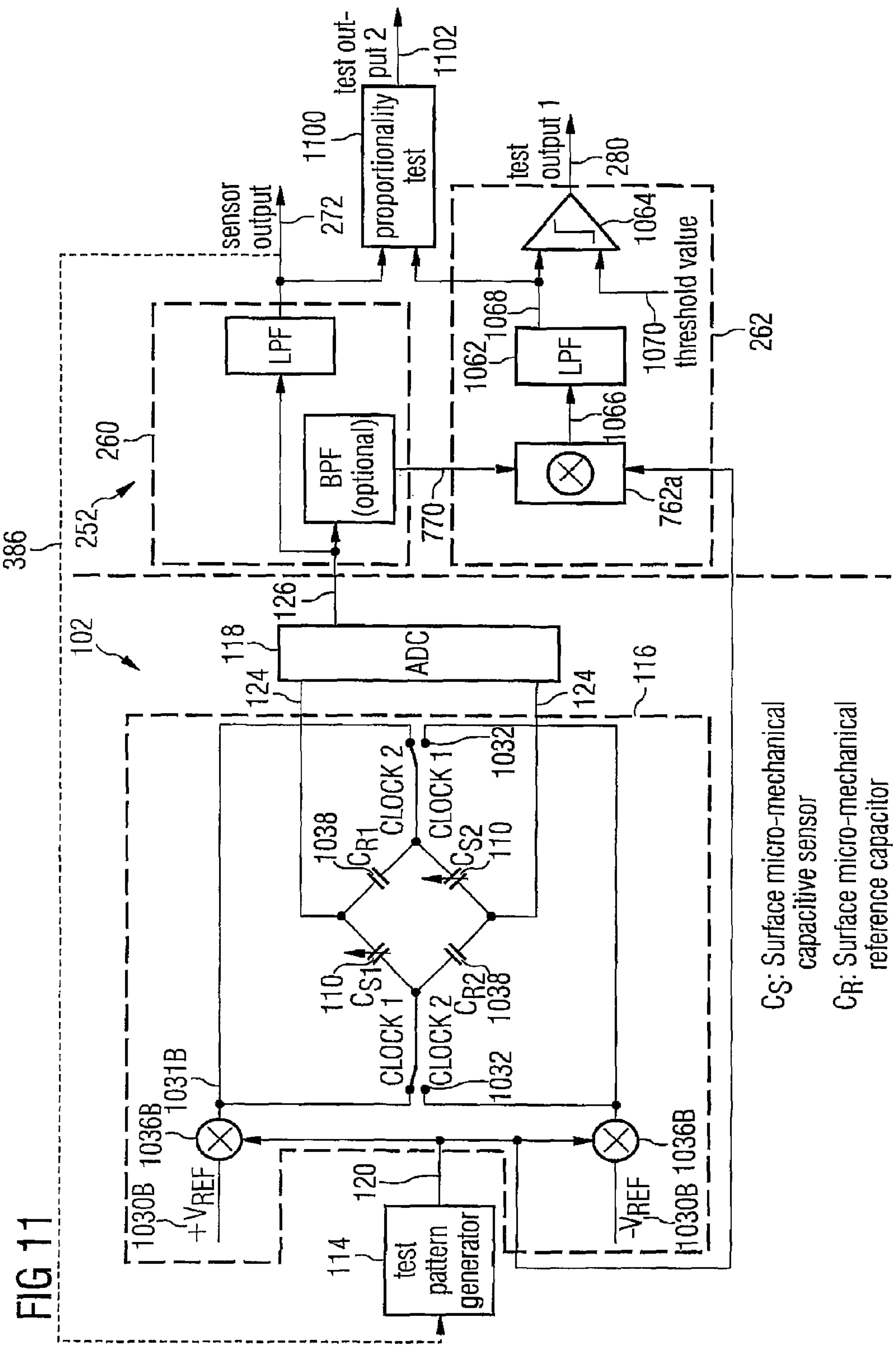

FIGS. 10-11 show further embodiments of a sensor means coupled to an evaluation means. The sensor means comprises an apparatus 1002 for generating a sensor signal, and the evaluation means comprises an apparatus 252 for online testing of a signal path, respectively.

FIG. 10 shows a sensor means which comprises an apparatus 102 for generating a sensor signal as well as a plurality of sensor cells 110. Apparatus 102 for generating a sensor signal comprises a sensor circuit 110*c*, a means 114 for providing at least two mutually different test signals, two means 116 for changing the sensor cell output signal, and a means 118 for outputting the sensor signal. A test signal 120 of the at least two mutually different test signals is connected to means 116 for changing the sensor cell output signal. In response to the test signal 120 of at least two mutually different test signals, means 116 for changing the sensor cell output signal provide an additive signal 1021 and feed same into sensor cell output signal 122 of sensor circuit 110 to obtain sensor signal 124. Sensor signal 124 is connected to means 118 for outputting the sensor signal. Means 118 for outputting the sensor signal is configured to provide the derived signal 126. In this embodiment, means 118 for outputting the sensor signal is an analog-digital converter, in particular a second-order sigma-delta converter. The analog-digital converter 118 represents a signal path monitored by the online test.

In this embodiment, sensor cells 110 are surface-mechanical capacitive sensors arranged, along with surface-micromechanical reference capacitors 1038, in a capacitive pressure sensor measuring bridge. The measuring bridge comprises two sensor cells 110 and two reference capacitors 1038, respectively. The measuring bridge is connected to a reference voltage 1030 via clock-controlled changeover switches 1032 controlled using first and second clocks. Switching over reference voltage 1030 by the clock-controlled changeover switches 1032 results in a clock-controlled recharging of the capacitive pressure sensor measuring bridge. Means 116 for changing the sensor cell output signal also comprise a reference voltage 1030 and a clock-controlled changeover switch 1032, respectively. In addition, they comprise a modulator 1036 and a capacitor 1039, respectively. The clock-controlled changeover switches 1032 generate an input voltage 1030 by reversing the polarity of the reference voltage. The reversal of the polarity is conducted via modulators 1036 which are coupled to reference voltage 1030 as well as to at least one test signal 120 of the plurality of mutually different test signals.

The polarity reversal operation is effected by the at least one test signal 120, of the plurality of mutually different test signals, which is generated within means 114 for providing at least two mutually different test signals, which in this embodiment is a test pattern generator having several test patterns. A capacitor 1039 is connected to the changeover switch 1032. The input voltage generated by changeover switch 1032 results in the capacitor being recharged. As a result, the additive signal 1021 exhibits a test pattern which depends on the test signal 120. A test pattern of the plurality of different test patterns is preferably free from a mean value and has a frequency clearly exceeding the sensor cell output signal frequencies. Additive signal 1021 is fed into the sensor cell output signal within means 116 for changing the sensor cell output signal. The sensor signal 124 resulting therefrom is detected by means 118 for outputting the sensor signal. In this embodiment, means 118 for outputting the sensor signal is a sigma-delta converter which generates the derived signal 126 from the sensor signal 124.

Alternatively to test pattern generator 114, additive signal 1021 may be directly generated using a voltage source sampled using the upstream switches 1032 and the capacitors 1039. Alternatively to feeding the additive signal 1021 directly into sensor cell output signal 1022, the sigma-delta converter and/or the analog-digital converter may also exhibit an additional adder input into which the additive signal 1021 is fed in an additive manner. In another possible variation, the sigma-delta converter and/or the analog-digital converter has a summing amplifier connected upstream from it, into which a test signal of the plurality of mutually different test signals is fed.

Alternatively to the capacitive measuring bridge consisting of the surface-micromechanical capacitive sensors 110 and the surface-mechanical reference capacitors 1038, as well as alternatively to capacitors 1039 for generating the additive signal 1021, a resistive measuring bridge or a Hall probe may equivalently also be drawn upon in connection with resistors for generating the additive signal. With a resistive measuring bridge or Hall probe, an additive signal may be generated, instead of the switchable measuring resistors, in that a test stimulus is fed into the sensor cell output signals as a current signal using current sources.

FIG. 10 also shows an evaluation means coupled to the sensor means and comprising an apparatus 252 for online testing. Apparatus 252 for online testing comprises a means 260 for processing the sensor signal, and a means 262 for examining the signal processed. Means 260 for processing the sensor signal is connected to the derived signal 126. In response to the derived signal 126, means 260 for examining the signal processed provides a processed signal 270 and an evaluation signal 272. Means 262 for examining the signal processed is connected to the processed signal 270 and, in this embodiment, also to means 114 for providing at least two different test signals. In response to the processed signal 270 and the test signal 120, means 262 for examining the signal processed provides a fault indication 280 and/or a warning indication 282.

Means 260 for processing the sensor signal or the derived signal comprises a low-pass filter 1050 and a band-pass filter 1052. Both low-pass filter 1050 and band-pass filter 1052 are connected to the derived signal 126. Since additive signal 1021, which contains the test information of test signal 120, exhibits a clearly higher frequency than sensor cell output signal 122, the information portion of test signal 120 may be masked out in the derived signal 126 using low-pass filter 1050. The resulting evaluation signal 272 contains the measurement information of sensor cell output signals 122 in the derived signal 126. Evaluation signal 272 is passed on to an evaluation point (not shown in FIGS. 10 and 11). The test information portion of derived signal 126 is isolated using band-pass filter 1052, and is passed on as processed signal 270 to means 262 for examining the processed signal.

Means 262 for examining the processed signal comprises a demodulator 762*a*, a low-pass filter 1062 and a comparator means 1064 in the form of a comparator. Initially, processed signal 270 is demodulated within demodulator 762*a* in a coherent manner with test signal 120. A resulting demodulated signal 1066 is subsequently low-pass filtered within low-pass filter 1062 to improve a signal-to-noise efficiency ratio. The low-pass filtered signal 1068 as well as an adjustable threshold-value signal 1070 are detected as input values by comparator means 1064. Comparator means 1064 compares the low-pass filtered signal 1068 with a view to adherence to a minimum value determined by threshold-value signal 1070. If this value is fallen below, the test information of a test signal which is, or was, active at the time is no longer contained in the derived signal 126, and means 262 for examining the signal processed signals a warning by means of warning indication 282 and/or indicates a fault by means of fault indication 280. In addition, as has already been described above, means 114 for providing at least two different test signals may be told by means 262 for examining to select a different one of the at least two different test signals for testing, means 114 for providing further being configured to provide information to means 262 for examining about which test signal of the at least two mutually different test signals is currently active.

As is indicated by reference numeral 386, it is possible to associate, in some embodiments, one of the at least two mutually different test signals 120 may be associated with a value or range of values of the detected sensor cell output signal 272 provided by the sensor cell as a function of the physical quantity, by feeding back the detected sensor cell output signal 272 to means 114 for providing, it being possible for the association to take place in a manner described above.

For further coverage, or protection, and fault localization, the "current test signal not present" cause of failure may be separately tested by checking the existence of the currently active test signal of the plurality of mutually different test signals. It is particularly advantageous to perform the check prior to demodulator 762*a* to ensure that in the event of an absent, open or false test signal 120, such as direct current, a random demodulation result does not indicate fault-free functioning of the overall system despite a malfunction of apparatus 252 for online testing a signal path, or of apparatus 102 for generating a sensor signal. For example, it is possible to test here whether the currently active test signal of the plurality of mutually different test signals is present at the right frequency or contains a certain pattern. In the embodiment shown in FIG. 10, the additional feature for checking test signal 120 is depicted in the form of a means 1080 for verifying the test signal. Means 1080 for verifying the test signal is connected to the currently active test signal 120 of the plurality of mutually different test signals, and is configured to provide a second fault indication 1082 in the event of an absent and/or faulty test signal.

FIG. 11 shows a further embodiment of a sensor means coupled to an evaluation means.

The sensor means comprises an apparatus 102 for generating a sensor signal, which includes a means 114 for providing at least two mutually different test signals, a means 116 for changing the sensor cell output signal, and a means 118 for outputting the sensor signal. Unlike the embodiment shown in FIG. 10, in this embodiment sensor cells 110 are arranged within means 116 for changing the sensor cell output signal. In accordance with the embodiment, the sensor cells 110 are arranged within a measuring bridge in FIG. 10. Means 116 for changing the sensor cell output signal comprises a reference voltage 1030*b*, 1030*b*' which is modulated within modulators 1036*b* using test signal 120 to obtain a measuring bridge voltage 1031*b*. That portion of test signal 120 which is contained within bridge voltage 1031*b* influences sensor signal 124 in a manner which is inversely proportional to a deflection of the measuring bridge. Means 116 for changing the sensor cell output signal in this manner provides sensor signal 124 which depends both on test signal 120 and on a sensor cell output signal (not shown) provided by sensor cells 110 on the grounds of a physical quantity detected. Sensor signal 124, in turn, is connected to means 118 for outputting the sensor signal, means 118 being configured to provide derived signal 126.

Evaluation means 252 shown in FIG. 11 comprises a means 260 for processing the sensor signal, and a means 262 for examining the signal processed. Means 260, 262 correspond to the means shown in FIG. 10 and have the same reference numerals.

In addition, apparatus 252*b* comprises a means 1100 for comparing a ratio. Means 1100 for comparing the ratio is connected to evaluation signal 272 of means 260 for processing the sensor signal, and to low-pass filtered signal 1068 of means 262 for examining the signal processed, and is configured to provide a third fault indication signal 1102 in response to evaluation signal 272 and low-pass filtered signal 1068. When the currently active test information provided by means 114 for providing at least two mutually different test signals influences sensor signal 124 in a manner which is proportional or inversely proportional to the measurement information on the grounds of the physical quantity to be detected, this proportionality may be monitored within means 1100 for comparing the ratio. In the event that the proportionality is not met, this failure is provided by means of the third fault indication 1102.

In the event of a coherent demodulation within demodulator 762*a* using the currently active test signal 120, as is shown in the above illustrations, band-pass filter 1052 upstream from demodulator 762*a* may be dispensed with. Thereby, a selectivity of the fault recognition path is degraded, however this may be compensated for by a lower cut-off frequency of low-pass filter 1062.

If the demodulation within demodulator 762*a* is not performed in a coherent manner, band-pass filtering will be necessitated. Demodulation downstream from band-pass filtering is, in the simplest case, a magnitude formation, for example.

Two test signals $s_1(t)$ and $s_2(t)$ and/or test patterns are generally to be considered as mutually different if correlation factor $\rho$ of the two test signals is smaller than one. The correlation factor has a value of $\rho=1$, for example, if signal $s_1(t)$ is correlated with signal $s_2(t)=|k|s_1(t)$. In this case, the two signals are referred to as common-moving. The correlation factor has a value of $\rho=-1$ if signal $s_1(t)$ is correlated with signal $s_2(t)=-|k|s_1(t)$. In this case, the two signals are referred to as counter-moving. A special situation is at hand if the correlation factor assumes a value of $\rho=0$. Then, the two signals are referred to as orthogonal. As the examples show, the correlation factor is a measure of how similar two signals $s_1(t)$ and $s_2(t)$ are to each other, and should, in accordance with embodiments, invariably assume a value of $\rho<1$, preferably $\rho=0$.

Even though different embodiments were explained in detail above, it is obvious that the present invention is not limited to these embodiments. In particular, the present invention may also be applied to other apparatuses and methods wherein the transmission of measuring information detected is ensured by combining the measurement information with a test stimulus, and wherein a successful or unsuccessful transmission is signaled by means of an evaluation of the test stimulus transmitted.

In accordance with the embodiments shown, the present application also includes a method of generating a sensor signal suitable for online testing of a signal path from a sensor cell to an evaluation point, and a method of online testing of a signal path from a sensor cell to an evaluation point.

Depending on the circumstances, the method of generating a sensor signal and the method of online testing of a signal path may be implemented in hardware or in software. The implementation may be effected on a digital storage medium, in particular a disc, CD, DVD or a ROM, PROM, Flash, EEPROM or a different non-volatile storage medium having electronically readable control signals which may cooperate with a programmed computer system—in particular in the configuration, which is particularly advantageous for integrated systems, of an embedded microcontroller or an embedded DSP—such that the respective method is performed. Generally, the present application also encompasses a computer program product having a program code, stored on a machine-readable carrier, for performing the method, when the computer program product runs on a computer. In other words, the different embodiments may, thus, also be realized as a computer program having a program code for performing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for generating a sensor signal which is suitable for online testing of a signal path from a sensor cell to an evaluation point, the sensor cell providing a sensor cell output signal as a function of a physical quantity to be detected, the apparatus comprising:

a provider for providing at least two mutually different test signals;

a changer for changing the sensor cell output signal on the basis of the at least two mutually different test signals in accordance with a predetermined change specification to acquire the sensor signal, so that the sensor signal depends on the sensor cell output signal and the at least two test signals;

an output unit for outputting the sensor signal or a signal derived from the sensor signal onto the signal path; and a selector for selecting one of the at least two mutually different test signals, and the changing includes a change in the sensor cell output signal on the basis of the currently selected test signal of the at least two mutually different test signals so as to switch between the at least two mutually different test signals, depending on the selection.

2. The apparatus as claimed in claim 1, the apparatus further including an output unit for outputting information, to the evaluation point, about which test signal of the at least two mutually different test signals has been selected last.

3. The apparatus as claimed in claim 1, a selection of a test signal from the at least two mutually different test signals depending on the sensor cell output signal provided by the sensor cell as a function of the physical quantity.

4. The apparatus as claimed in claim 1, wherein, in accordance with the selection, a first one of the two mutually different test signals is selected in the event of a first value or range of values of the sensor cell output signal, and a second test signal of the at least two mutually different test signals is selected in the event of a second value or range of values of the sensor cell output signal.

5. The apparatus as claimed in claim 1, wherein the selection of a test signal from the at least two mutually different test signals depends on an estimated value for a value or range of values of the sensor cell output signal provided by the sensor cell as a function of the physical quantity.

6. The apparatus as claimed in claim 1, wherein the selection of a test signal from the at least two mutually different test signals is based on a cross-correlation of one of the at least two mutually different test signals with a sensor signal derived from the sensor signal.

7. The apparatus as claimed in claim 1, wherein the selection of a test signal from the at least two mutually different test signals depends on the test signal last selected.

8. The apparatus as claimed in claim 1, wherein the selector responds to a test signal selection signal from the evaluation point so as to perform the selection.

9. An apparatus for generating a sensor signal which is suitable for online testing of a signal path from a sensor cell to an evaluation point, the sensor cell providing a sensor cell output signal as a function of a physical quantity to be detected, the apparatus comprising:

a provider for simultaneously providing at least two mutually different and orthogonal test signals;

a changer for changing the sensor cell output signal on the basis of the at least two mutually different and orthogonal test signals in accordance with a predetermined change specification to acquire the sensor signal, so that the sensor signal depends on the sensor cell output signal and the at least two mutually different and orthogonal test signals; and an output unit for outputting the sensor signal or a signal derived from the sensor signal onto the signal path.

10. An apparatus for online testing a signal path from a sensor cell to an evaluation point, the sensor cell providing a sensor cell output signal as a function of a physical quantity to be detected, the sensor cell output signal being changed in accordance with a predetermined change specification on the basis of at least two mutually different test signals to form a sensor signal, the sensor signal or a signal derived from the sensor signal being transmittable via a signal path, the apparatus comprising:

a processor for processing the sensor signal or the signal derived from the sensor signal while taking into account the predetermined change specification to acquire a processed signal;

an examiner for examining the processed signal with regard to the presence of the at least two mutually different test signals to provide a signal path fault indication on the basis thereof;

wherein the examiner is adapted to receive information about which of the at least two test signals is currently active, the examination comprising examining the processed signal with regard to the currently active test signal in order to switch between the test signals depending on the information received.

11. The apparatus as claimed in claim 10, wherein the examination performed by the examiner comprises replacing a test signal if a potential fault is detected for said test signal.

12. The apparatus as claimed in claim 10, wherein the examination performed by the examiner comprises, if a test of the signal path is successful using a current test signal, testing is continued using the same test signal.

13. The apparatus as claimed in claim 10, wherein the signal path error indication comprises a fault probability which is incremented with each confirmation of a fault of the signal path by a further test pattern of the at least two mutually different test patterns.

14. An apparatus for online testing a signal path from a sensor cell to an evaluation point, the sensor cell providing a sensor cell output signal as a function of a physical quantity to be detected, the sensor cell output signal being changed in accordance with a predetermined change specification on the basis of at least two mutually different test signals to form a sensor signal, the sensor signal or a signal derived from the sensor signal being transmittable via a signal path, the apparatus comprising:

a processor for processing the sensor signal or the signal derived from the sensor signal while taking into account the predetermined change specification to acquire a processed signal;

an examiner for examining the processed signal with regard to the presence of the at least two mutually different test signals to provide a signal path fault indication on the basis thereof, wherein the examination of the processed signal comprises an examination with regard to a simultaneous presence of a plurality of test signals, the test signals being orthogonal to one another.

15. An apparatus for generating a sensor signal, comprising:

a signal changer having an input for a plurality of mutually different test signals, an input for a sensor cell output signal, the input being couplable to an output of a sensor cell, and an output for the sensor signal, the output being couplable to an evaluation point via a signal path to be tested; and a test signal selector having an input for a test signal selection signal, an input for the sensor cell output signal, an output for a test signal selection indicator signal, and an output for a selected test signal from the plurality of different test signals.

16. The apparatus as claimed in claim 15, the apparatus further comprising a noise shaping coder or a predictive coder having an input for the sensor signal and an output for a signal derived from the sensor signal.

17. The apparatus as claimed in claim 16, wherein the noise shaping coder is a sigma-delta converter.

18. A method for generating a sensor signal which is suitable for online testing of a signal path from a sensor cell to an evaluation point, the sensor cell providing a sensor cell output signal as a function of a physical quantity to be detected, the method comprising:

providing at least two mutually different test signals;

changing the sensor cell output signal on the basis of the at least two mutually different test signals in accordance with a predetermined change specification to acquire the sensor signal, so that the sensor signal depends on the sensor cell output signal and the at least two test signals; and outputting the sensor signal or a signal derived from the sensor signal onto the signal path; and selecting one of the at least two mutually different test signals, and changing including a change in the sensor cell output signal on the basis of the currently selected test signal of the at least two mutually different test signals so as to switch between the at least two mutually different test signals, depending on the selection.

19. The method as claimed in claim 18, the method further comprising outputting information, to the evaluation point, about which test signal of the at least two mutually different test signals has been selected last.

20. The method as claimed in claim 18, a selection of a test signal from the at least two mutually different test signals depending on the sensor cell output signal provided by the sensor cell as a function of the physical quantity.

21. The method as claimed in claim 18, wherein, in accordance with the selection, a first one of the at least two mutually different test signals is selected in the event of a first value or range of values of the sensor cell output signal, and a second test signal of the at least two mutually different test signals is selected in the event of a second value or range of values of the sensor cell output signal.

22. The method as claimed in claim 18, wherein the selection of a test signal from the at least two mutually different test signals depends on an estimated value for a value or range of values of the sensor cell output signal provided by the sensor cell as a function of the physical quantity.

23. The method as claimed in claim 18, wherein the selection of a test signal from the at least two mutually different test signals is based on a cross-correlation of one of the at least two mutually different test signals with a sensor signal derived from the sensor signal.

24. The method as claimed in claim 18, wherein the selection of a test signal from the at least two mutually different test signals depends on the test signal last selected.

25. The method as claimed in claim 18, wherein selecting responds to a test signal selection signal from the evaluation point so as to perform the selection.

26. A method for generating a sensor signal which is suitable for online testing of a signal path from a sensor cell to an evaluation point, the sensor cell providing a sensor cell output signal as a function of a physical quantity to be detected, the method comprising:

simultaneously providing at least two mutually different and orthogonal test signals;

changing the sensor cell output signal on the basis of the at least two mutually different and orthogonal test signals in accordance with a predetermined change specification to acquire the sensor signal, so that the sensor signal depends on the sensor cell output signal and the at least two mutually different and orthogonal test signals; and outputting the sensor signal or a signal derived from the sensor signal onto the signal path.

27. A method for online testing of a signal path from a sensor cell to an evaluation point, the sensor cell providing a sensor cell output signal as a function of a physical quantity to be detected, the sensor cell output signal being changed in accordance with a predetermined change specification on the basis of at least two mutually different test signals to form a sensor signal, the sensor signal or a signal derived from the sensor signal being transmittable via a signal path, the method comprising:

processing the sensor signal or the signal derived from the sensor signal while taking into account the predetermined change specification to acquire a processed signal;

examining the processed signal with regard to the presence of the at least two mutually different test signals to provide a signal path fault indication on the basis thereof; and receiving information about which of the at least two test signals is currently active, the examination comprising examining the processed signal with regard to the currently active test signal in order to switch between the test signals depending on the information received.

28. The method as claimed in claim 27, further comprising outputting a test signal change signal upon an examination which establishes an absence of a currently active test signal, the test signal change signal being intended to affect a renewed selection among the test signals in order to change the currently active test signal.

29. The method as claimed in claim 27, wherein the signal path fault indication comprises information about a number of absent test signals.

30. The method as claimed in claim 27, wherein the examination comprises, upon an examination result establishing that a currently active test signal is not present, a continuation of the examination with regard to another one of the test signals.

31. The method as claimed in claim 27, wherein the examination comprises, if a test of the signal path is successful using a current test signal, testing is continued using the same test signal.

32. The method as claimed in claim 27, wherein the signal path error indication comprises a fault probability which is incremented with each confirmation of a fault of the signal path by a further test pattern of the at least two mutually different test patterns.

33. A method for online testing of a signal path from a sensor cell to an evaluation point, the sensor cell providing a sensor cell output signal as a function of a physical quantity to be detected, the sensor cell output signal being changed in accordance with a predetermined change specification on the basis of at least two mutually different test signals to form a sensor signal, the sensor signal or a signal derived from the sensor signal being transmittable via a signal path, the method comprising:

processing the sensor signal or the signal derived from the sensor signal while taking into account the predetermined change specification to acquire a processed signal;

examining the processed signal with regard to the presence of the at least two mutually different test signals to provide a signal path fault indication on the basis thereof, wherein the examination of the processed signal comprises an examination with regard to a simultaneous presence of a plurality of test signals, the test signals being orthogonal to one another.

* * * * *